Aug. 17, 1937.   R. A. MADDOX   2,090,057

COUNTER TROUGH AND GUARD

Filed Sept. 9, 1935

INVENTOR.
R. A. MADDOX.
BY
ATTORNEY

Patented Aug. 17, 1937

2,090,057

UNITED STATES PATENT OFFICE 2,090,057

COUNTER TROUGH AND GUARD

Royace A. Maddox, Ventura, Calif.

Application September 9, 1935, Serial No. 39,708

4 Claims. (Cl. 312—140.4)

My invention relates particularly to restaurant or similar counters.

In restaurant counter construction, it is customary to place steam tables, ice cream containers, or the like, at the inner side of counters, and further to provide high and unsightly guards at the inner sides or edges of the counters to prevent crumbs, food stuffs, cigarettes, and other foreign matter from falling or being brushed, accidentally or otherwise, to the inner side of the counter.

One of the principal objects of this invention is to do away with these undesirable features, and to provide a restaurant counter having a combination trough and guard at the rear side so as to guard or protect the steam tables, ice cream containers, and other objects at the inner side of the counter, from undesirable foreign matter which may be on the counter and which may be desired to be cleaned off the counter and which in this instance may be easily brushed into and carried away in the trough.

Another important object is to provide a combination trough and guard which is so constructed that the rear portion of the trough is higher than the counter top so that matter brushed toward the trough will not readily pass beyond or over the trough but will be more easily directed into the same.

A further object of my invention is the provision of a shelf at the inner side of the trough for holding condiment shakers, containers and the like, so they may always be out of the way for keeping the counter clear and clean, and further so that these articles may be kept clean; and also to provide such a shelf which may be easily cleaned and drained into the trough.

With these and other objects in view as will appear hereinafter, I have devised a counter trough and guard, as will be hereinafter described in detail and particularly set forth in the appended claims, reference being had to the accompanying drawing and to the characters of reference thereon which form a part of this application, in which:

Figure 1:
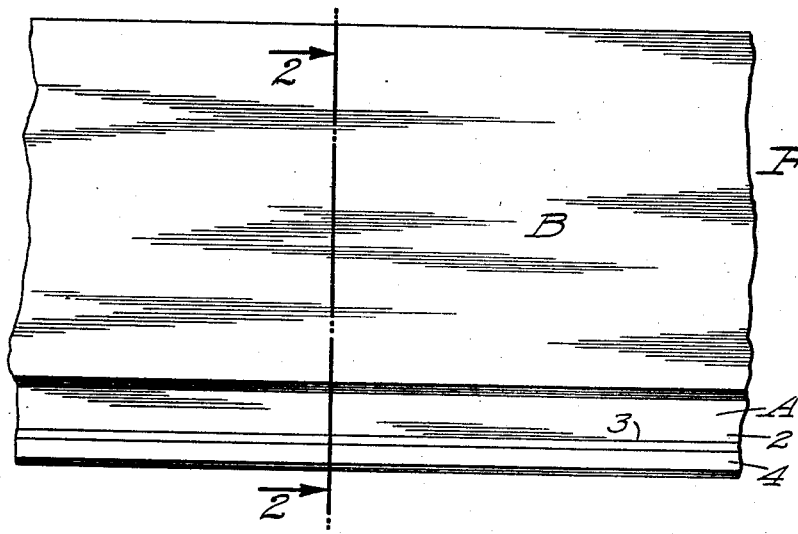
Fig. 1 is a fragmentary plan view of a restaurant counter embodying my invention.
Figure 2:
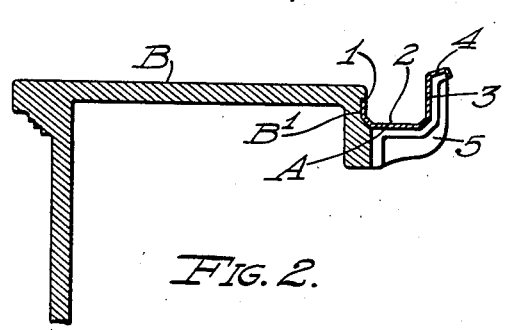
Fig. 2 is a fragmentary sectional elevation taken through 2—2 of Fig. 1.

In Fig. 2 may be readily seen the cross section of the combination and guard A and its relation to the counter B itself. The trough is preferably formed from sheet metal with its front side or flange 1 imbedded in a groove $B^1$ at the back edge and below the top of the counter. All recesses and sharp corners are avoided so that all parts may be easily cleaned. The bottom 2 of the trough is positioned below the table or counter top so that crumbs, liquids, or refuse may be easily brushed into the trough. The trough is also wide for readily receiving and carrying away relatively large objects. The rear wall 3 extends above the table or counter top so as to provide a ready barrier when crumbs and refuse are brushed into the trough, and therefore provides an excellent guard against such matters being brushed or thrown into the steam table or containers behind the counter. The upper edge of the rear wall is provided with a wide ledge 4 to increase the width of the guard and to finish the rear edge of the trough. This ledge may be slightly inclined towards the trough to facilitate objects being directed into the trough and further to increase a sturdy appearance. This combination trough and guard may be rigidly supported with respect to the counter by a plurality of spaced brackets 5.

All the foreign matter falling or brushed into the trough may be easily carried away by a stream of water directed into one end of the trough.

Figure 4:
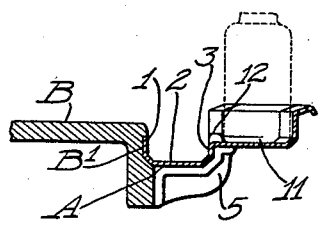
Figure 3:
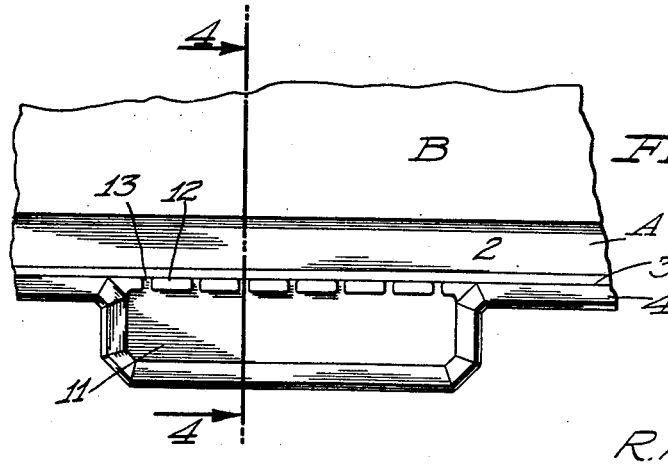
Fig. 3 is a fragmentary plan view of such a counter showing an extended supporting shelf for condiment shakers, and the like; and, Fig. 4 is a fragmentary sectional elevation taken through 4—4 of Fig. 3.

In Fig. 3, I have shown a tray or shelf 11 positioned and carried by the rear edge of the trough. These trays or shelves are positioned at desired intervals along the inner edge of the counter. These trays are relatively long and extend longitudinally of the counter or trough. The bottom of each tray is positioned above the bottom of the trough, as shown in Fig. 4, but preferably below the rear edge of the trough. The bottom of the tray is separated from the trough by a ridge 12 which is preferably in short lengths, providing channels from the bottom of the tray to the trough for draining the former into the latter.

Though I have shown and described a particular construction, and a certain modification thereof, I do not wish to be limited to the same, but desire to include in the scope of my invention, the construction, combination and arrangement substantially as set forth in the appended claims.

I claim:—

1. In a restaurant counter having a long serving top, a wide trough secured to the inner edge and longitudinally of the top, the rear edge extending above the top face of the counter table providing a guard to prevent articles from passing freely over and beyond the inner edge of the serving top of the counter.

2. In a serving table, a trough secured to an edge of the table and provided with lateral extensions at intervals at the outer side of the trough forming short supporting shelves projecting from said outer side.

3. In a serving table, a trough secured to an edge of the table and provided with a lateral extension at the outer side of the trough forming a supporting shelf, the plane of the latter being positioned above the bottom of the trough.

4. In a serving table, a trough secured to an edge of the table and provided with a lateral extension at the outer side of the trough forming a supporting shelf, the plane of the latter being positioned above the bottom of the trough and separated from the latter by ridges extending above the plane of the shelf.

ROYACE A. MADDOX.